United States Patent [19]

Kobayashi et al.

[11] Patent Number: 5,091,984
[45] Date of Patent: Feb. 25, 1992

[54] OPTICAL SWITCH FOR USE WITH OPTICAL FIBERS

[75] Inventors: Yuji Kobayashi; Yasuo Matsuda; Toshifumi Hosoya; Tsuyoshi Nonaka, all of Kanagawa, Japan

[73] Assignee: Sumitomo Electric Industries, Ltd., Osaka, Japan

[21] Appl. No.: 629,692

[22] Filed: Dec. 18, 1990

[30] Foreign Application Priority Data

Dec. 20, 1989 [JP] Japan ................ 1-329842

[51] Int. Cl.⁵ .............................................. G02B 6/02
[52] U.S. Cl. ................................................. 385/16
[58] Field of Search ............... 350/96.15, 96.20–96.21, 350/96.13, 96.29

[56] References Cited

U.S. PATENT DOCUMENTS

| | | | |
|---|---|---|---|
| 3,668,663 | 6/1972 | Chandross et al. | 350/354 X |
| 4,786,130 | 11/1988 | Georgiou et al. | 350/96.15 |
| 4,796,968 | 1/1989 | Coccoli et al. | 350/96.15 |
| 4,989,946 | 2/1991 | Williams et al. | 350/96.20 |

FOREIGN PATENT DOCUMENTS

| | | |
|---|---|---|
| 0204493 | 12/1986 | European Pat. Off. . |
| 64-002020 | 1/1989 | Japan . |
| 8911674 | 11/1989 | PCT Int'l Appl. . |
| 2210873 | 6/1989 | United Kingdom . |

Primary Examiner—Akm Ullah
Attorney, Agent, or Firm—Cushman, Darby & Cushman

[57] ABSTRACT

An optical switch for switching an optical path by changing the refractive index of the circumference of a light coupling region of a directional coupler is disclosed. Such a change is accomplished by a photochromic compound in the circumferential medium of the light coupling region. Such a photochromic compound when beamed with light of a specific wavelength undergoes a photochromic reaction which changes the refractive index of the circumferential medium of the light coupling region. Such a reaction is reversible when beamed with light of another specific wavelength.

20 Claims, 3 Drawing Sheets

OPTICAL SWITCH FOR USE WITH OPTICAL FIBERS

BACKGROUND OF THE INVENTION

1. Field of Invention

The present invention relates to an optical switch, and particularly relates to an optical switch for switching an optical path by changing a refractive index of the circumference of a light coupling region of a directional coupler

2. Description of Related Art

Among the best-known examples of conventional optical switches for use with optical fibers are optical switches of the waveguide-type, in which a waveguide is formed in an electrooptical crystal such as LiNbO3 or the like, or in which a waveguide and an electrode are formed in a semiconductor substrate such as GaAs or the like so that a voltage or a current is applied on a portion of the waveguide to change the refractive index of the portion to thereby switch the optical path. As disclosed in the specification of U.S. Pat. No. 4,786,130, an a optical switch is also known in which light is switched from one line to another line by changing the refractive index of the circumference o an optical fiber coupler by heating/cooling the circumferential medium.

However, as a means for changing the refractive index, generally, optical switches using an electrooptical crystal such as LiNbO3 or the like or a semiconductor such as GaAs or the like generally have a high refractive index, so that there occurs a large loss of energy in the connection of such optical switches with optical fibers. In optical switches which use a semiconductor substrate, there occurs a loss of several decibels. This type of optical switch is therefore not suitable for incorporation into an optical communication line.

Further, in most of the optical switches which use an electrooptical effect as the means for changing the refractive index, the optical switching operation, as a result of its structure, depends so much on the polarization direction of incident light that this polarization must be strictly controlled in order to achieve the desired function. Accordingly, the apparatus is necessarily large in size, which results in a large loss of energy.

Further, in the optical switch which uses the change of the refractive index by heating/cooling the circumferential medium, it is difficult to maintain at the same time both the temperature stability of the operation and the high switching speed. Therefore, high speed operation is limited.

SUMMARY OF THE INVENTION

The present invention solves the problems described above. An object of the present invention is therefore to provide an optical switch which is superior in its simplicity of connection with optical fibers, which is low in energy loss, which is superior in maintaining the temperature stability and high speed of the operation and which has no dependence on polarization.

According to the present invention, an optical switch, having means for performing switching by changing the refractive index of a circumferential medium of a light coupling region of a directional coupler, is characterized in that a material which can undergo a photochromic reaction is used as the circumferential medium.

In the above optical switch, as the directional coupler, an optical fiber coupler may be used.

As the circumferential medium in the above optical switch, a liquid or solid material in which a photochromic compound is dissolved may be used so as to utilize the photoinduced refractive-index change thereof. In particular, a macromolecular material with which a photochromic compound is combined is used as the circumferential medium so as to utilize the photoinduced refractive-index change thereof.

The photochromic reaction is used to cause a photoinduced reversible refractive-index change. The reaction is initiated by either of two differing wavelengths of light.

The light which controls the reaction originates from at least one optical fiber on either the incidence or emission side. The refractive-index change which results from the light leaking into the circumferential medium of the coupling region may be utilized to achieve the optical switching function.

As the directional coupler, various kinds of couplers having either a slab-type waveguide or a channel-type waveguide as a basic structure may be used, and specifically an optical fiber coupler can be used.

BRIEF DESCRIPTION OF THE DRAWINGS

FIGS. 6(A) and 5(B) are graphs showing a molecular property change due to the photochromic reaction.

DETAILED DESCRIPTION OF THE PREFERRED EMBODIMENTS

Figure 1A:
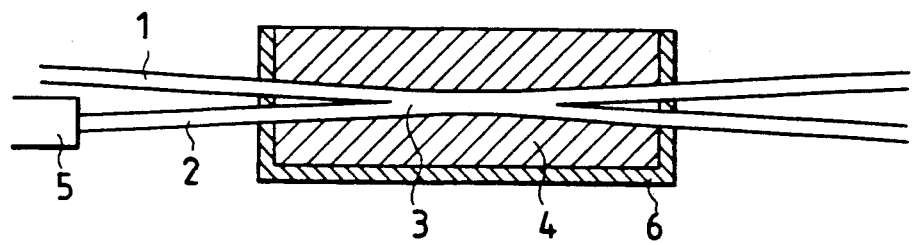
FIGS. 1(A) and 1(B) are schematic views illustrating different embodiments of the present invention.
Figure 1B:
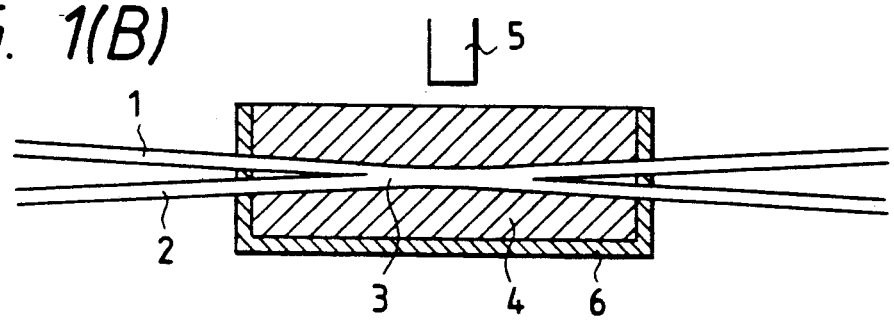

FIGS. 1(A) and 1(B) show two embodiments in which an optical fiber coupler is used as the directional coupler and a photochromic compound is used as the circumferential medium of the light coupling region. In the drawing, there are illustrated optical fiber portions 1 and 2 of the optical fiber coupler, a taper portion 3 formed by fusing and extending part of the two optical fibers, a photochromic compound 4 as the circumferential medium, a light irradiation device 5 for switching an optical path, and a vessel 6.

FIG. 1(A) shows an embodiment in which signal light is led into one optical fiber 1 of the optical fiber coupler, and the light irradiation device 5 is connected to the other optical fiber 2 so that the irradiation light which causes a photoinduced refractive-index change in the photochromic compound is led into the optical fiber 2. The refractive index of the circumference of the taper portion 3 is changed by the light irradiation through the optical fiber 2. This change is due to the evanescent light leaking out from the taper portion 3 which in turn leaks from the core of the optical fiber.

FIG. 1(B) shows another embodiment in which a light irradiation device 5 is placed outside an optical fiber coupler. The light which irradiates from the light irradiation device 5 beams into a photochromic compound.

Figure 2A:
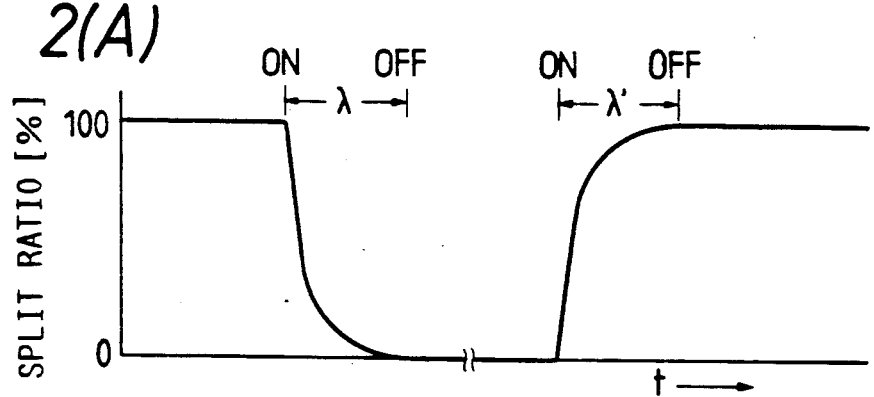
FIGS. 2(A) and 2(B) are views illustrating the operation of the embodiments.
Figure 2B:
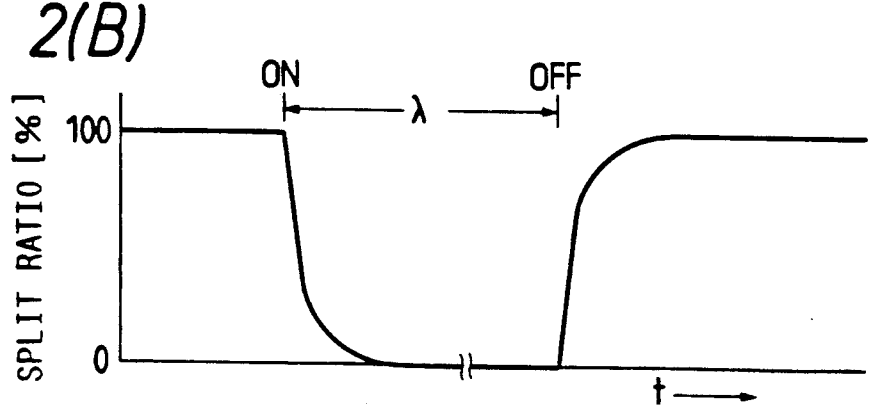

In either of the embodiments, an optical path can be switched at a low energy loss, at a high speed, and without the necessity of controlling polarization as in the P-P type optical switch described in FIG. 2(A) in which light having either of two different wavelengths of control light, $\lambda$ and $\lambda'$, is irradiated for a predetermined time, or as in the P-T type optical switch described in FIG. 2(B) in which the control light having the wavelength $\lambda$ is switched on and off.

In the case where the optical switch of this kind is connected to an optical fiber, such an optical-fiber coupler type optical switch as described above is superior in terms of the simplicity of the connection apparatus and of the minimization of energy loss especially in view of the form of mode field used.

Figure 3:
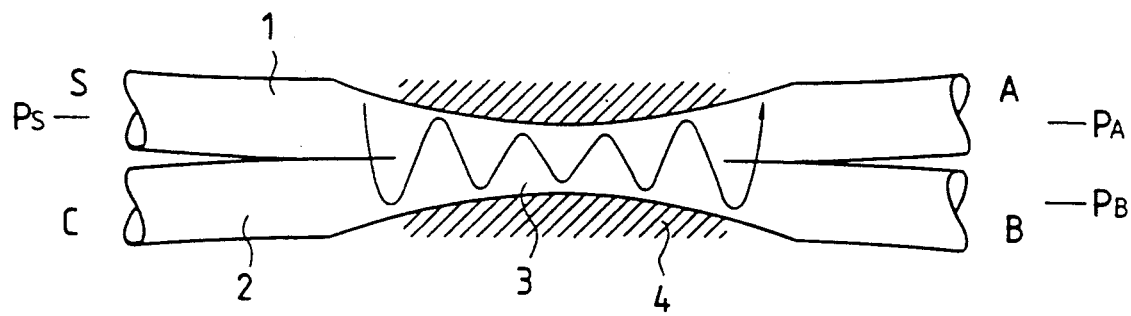
FIG. 3 is a schematic view of an optical switch using an optical fiber coupler.

FIG. 3 is a schematic view of the optical switch using an optical fiber coupler. In the drawing, the reference numerals 1 and 2 designate an optical fiber coupler formed with two optical fibers. The two optical fibers are fused and extended to thereby form a biconical taper portion 3.

In this optical fiber coupler, a distribution and coupling state of light is produced at the taper portion 3 by an evanescent field leaking out from the cores of the optical fibers. The characteristics of the optical fiber coupler depend on the shape of the taper portion of the two optical fibers 1 and 2 and the distribution of the refractive index.

It is known that if the refractive index of the circumferential portion of the taper portion 3 is changed, the light distribution and coupling state varies so that a change is caused in the splitting characteristics of the coupler.

Figure 4:
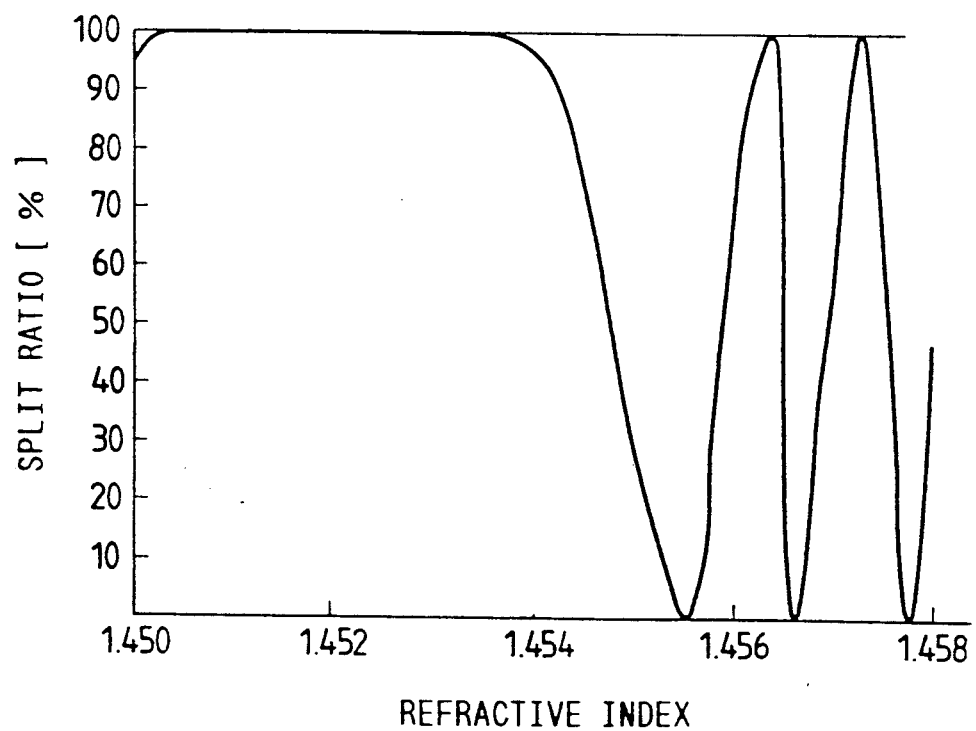
FIG. 4 is a view illustrating the operation of the optical fiber coupler type optical switch.

FIG. 4 is a graph showing a split ratio PA/PS at a wavelength $\lambda$ of 1.55 $\mu$m relative to a change of the refractive index n of the circumferential portion.

The data of FIG. 4 were obtained through theoretical calculation on the assumption that PA represents the output light emitted from an output terminal A of an optical fiber when optical power PS is led into one end S of one of the two optical fibers, and PB represents the output light emitted from an output terminal B of the other optical fiber through the light coupling region, the other optical fiber having one end C and the output end B. The abscissa shows the refractive index n of the circumferential medium. It has been found that the split ratio PA/PS suddenly changes when the refractive index n of the circumferential medium is in the vicinity of the refractive index $n_0 = 1.4583$.

Although the split ratios in this range are different in characteristics from each other depending on the wavelength, it was estimated that there were some positions where the PA values changed from 1 to 0 even when the refractive index changed only a little. Correspondingly, there were some positions where the PB values changed from 0 to 1. When an optical fiber coupler was actually tested on the basis of the theoretical calculation, the above-mentioned tendency was confirmed.

The splitting characteristics of light passing through the coupler varied widely in the range where the refractive index of the circumferential medium was near to that of the coupling region of the coupler.

If the points showing the maximum and minimum values are defined as singular points, it has been experimentally found that those singular points are located within a region not larger than 2 percent below the theoretical value of $n_0 = 1.4583$, and in a preferred embodiment, this region was not larger than 0.5 percent of an entire range where the refractive index of the circumferential material never exceeds the refractive index of the coupling region of the coupler. And, if the refractive index at the singular point is selected, the optical path can be effectively switched with a small refractive-index change which, in turn, prevents a large energy loss.

According to the present invention, a photoinduced refractive-index change by means of a photochromic compound is used as the optical path changing means.

The photochromic compound is characterized by its ability to undergo reversible transformation between two different chemical forms in response to irradiation with lights. This transformation gives rise to not only an absorption spectrum change but a refractive index change.

Figure 5:
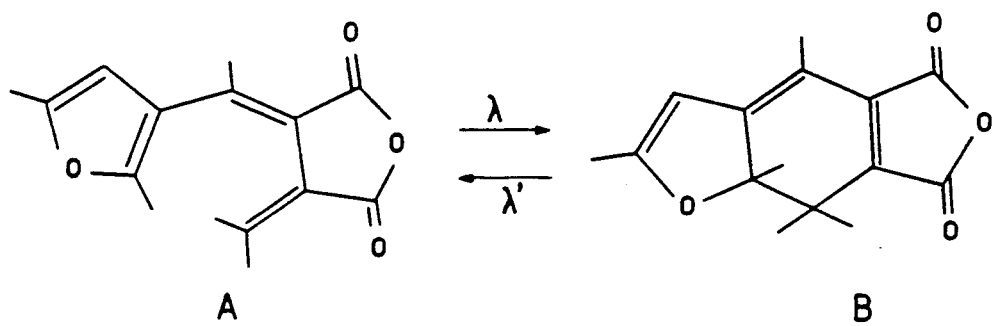
FIG. 5 is a view illustrating a molecular structure change in a photochromic reaction of fulgide which is a photochromic compound.

In one embodiment as the case of P-P type photochromism, the molecular structure is changed such that, when light having a wavelength $\lambda$ (= 325 nm) is radiated on a photochromic compound having a molecular structure A shown in FIG. 5, the molecular structure A is changed into another molecular structure B shown in FIG. 5. In this same embodiment, the photochromic compound B which has been changed in its molecular structure can be reversibly changed into the original one of FIG. 5 if the photochromic compound is irradiated with light having a wavelength $\lambda'$ (= 514.5 nm).

Figure 6A:
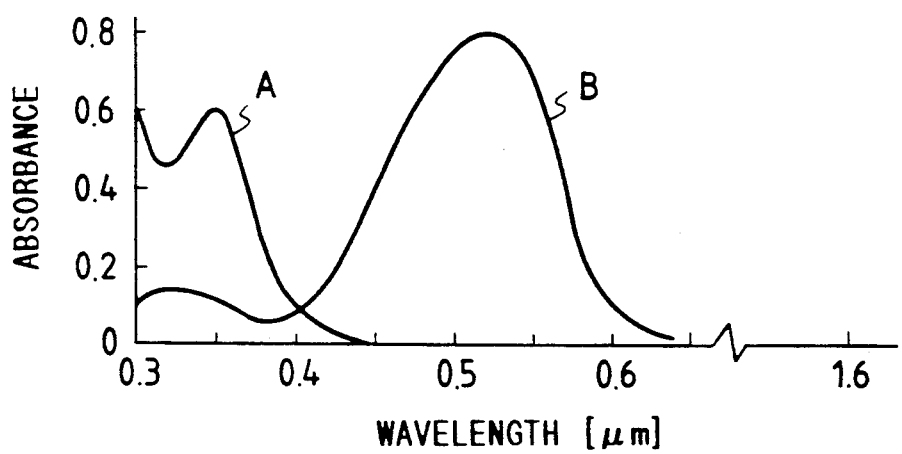
Figure 6B:
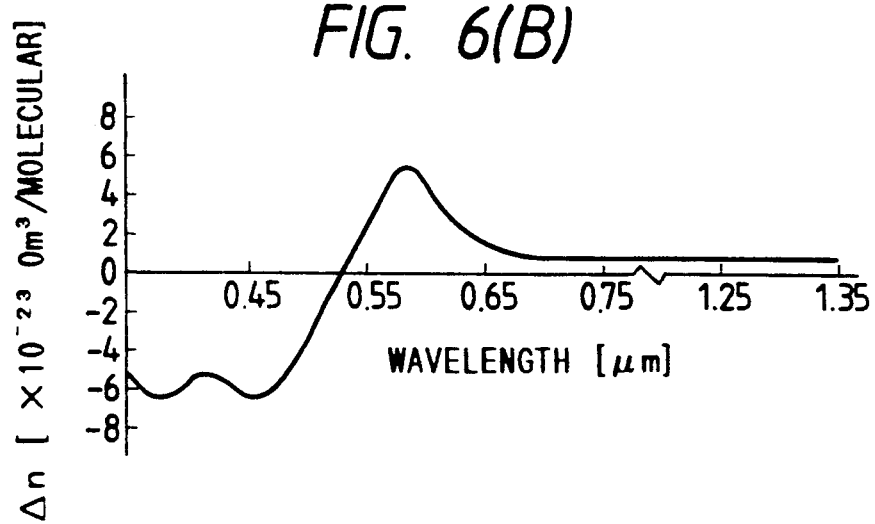

As shown in FIG. 6, the absorption spectrum changes and the molecular properties such as dipole moment, refractive index, and so on, also change when the molecular structure shifts between the structure A and the structure B shown in FIG. 5.

Since the change of the molecular properties due to the photochromic reaction is an optical reaction, the speed of the change is high enough so that a response on the order of 10 picoseconds is possible depending on conditions of a reaction system.

The range of wavelengths of the control light which can induce the photochromic reaction is peculiar to the photochromic compound used. Light in other wavelength ranges never induces the photochromic reaction. If the wavelength range is suitably selected, it therefore becomes possible to produce optical path switching which is not influenced by signal light transmitted inside the optical switch.

Generally, the photochromic reaction is possible in various forms such as in a bulk system, a solution system, a solid dispersion system, or the like, and in such forms, the photochromic compound can be used as the actual medium of the optical switch. However, when the photochromic reaction is used in an optical switch of the waveguide type or of the optical fiber type, it is necessary to adjust the refractive index of the whole medium, depending on the waveguide or the optical fiber to be used.

Since the refractive index of the photochromic compound in the bulk form is generally higher than that of the light coupling region, in order to use the photochromic reaction as the refractive-index changing means of the optical switch, it is necessary to use a method of making the refractive index of the whole medium the same as that of the light coupling region, for example, by dispersing the photochromic compound in a medium which has a refractive index lower than that of the light coupling region, or by chemically combining the photochromic compound with the medium.

From the above description of the drawings, it is apparent that according to the present invention, it is possible to provide an optical switch in which a photo-induced refractive-index change resulting from a photochromic reaction is used to change the refractive index of a circumferential material of a light coupling region of a directional coupler, so that an optical path can be switched at a high speed, the configuration of the optical switch is simple, and there is no dependency on polarization.

Further, when the optical fiber coupler is used as the directional coupler, it is possible to provide an optical switch which is superior in its simplicity of connection with optical fibers and which has a low energy loss, in addition to the other effects discussed above.

An example of the optical fiber coupler type optical switch in which fulgide (that is, trans-2-[1-(2,5-dimethyl-3-furanyl)ethylidene]-3-(1-methylethylidene)succinic anhydride) is used as the photochromic compound will be described.

The fulgide was dissolved in not-yet-hardened fluoroalkyl acrylate resin having a low refractive index, and the solution was poured into a light coupling region of an optical fiber coupler and allowed to harden. By changing the concentration of fulgide in the medium, the refractive index of the circumferential medium including fulgide was adjusted to 1.4555, a little lower than the refractive index 1.4583 of the light coupling region. The difference of refractive index, $\Delta n$, which results from the photochromic reaction of the fulgide-containing medium is proportional to the concentration of the fulgide in the medium. Accordingly, when fulgide and resin are dissolved together in solution, and a third material having a refractive index different from that of the resin is added to the solution, the difference, $\Delta n$, can be adjusted without changing the refractive index of the whole of the medium.

Assume now that when light power PS is led from one end S of the optical fiber coupler in FIG. 3 to the light coupling region of the P-P type optical switch formed as described above, the light power on the output side A is PA and the light power on the output side B is PB. With respect to the split ratio PA/PS on the output sides, PA and PB were 1 and 0 respectively in the initial state, while when light having a wavelength $\lambda = 325$ nm was beamed from an optical fiber end C, the optical path of the light originating from the end S was switched from A to B, so that PA was changed from 1 to 0, and PB was changed from 0 to 1. After that, even if the irradiation of light from C was stopped, the split ratio on the output sides was not changed.

While in this state, when light having wavelength $\lambda = 514.5$ nm was irradiated from C, the optical path of the light originating from S was switched again, so that PA was changed from 0 to 1, and PB was changed from 1 to 0. Thus, the optical path was returned to its initial state. The time required for switching the optical switch was about 0.5 nsec with light of wavelength $\lambda = 325$ nm and about 1 nsec with light of wavelength $\lambda' = 514.5$ nm. Thus, the speed was extremely high.

The above operational performance was not changed at all even when vertical polarization light, used as the signal light, was transmitted in the optical switch and the polarization light was rotated.

Although fulgide was used as the photochromic compound in the above example, the present invention is not specifically limited to fulgide. Any photochromic compound may be used as the refractive-index changing means of the optical switch, so long as the compound has little absorption in the range of the wavelength of the signal light used for the optical switch. Non-limiting examples of the photochromic compounds which may be used include fulgide, azobenzene, hydrazone, oxazone, diarylethene, salicylaldehyde, spiropyran, biimidazolyl, and their derivatives.

Further, although fluoroalkyl acrylate resin was used as the low refractive-index material in the above example, the present invention is not specifically limited to fluoroalkyl acrylate resin. Any material may be used as one component of the circumferential medium, so long as the material has a refractive index lower than that of the light coupling region and has little absorption in the wavelength ranges of the control light and the signal light. From the perspective of temperature stability of the refractive index, a solid material or a material which can be solidified is preferable for use as the above low refractive index material. Examples mainly include resins of fluoroalkyl (meth)acrylate, copolymer of vinylidene fluoride, silicone, and so on.

What is claimed is:

1. An optical switch, comprising:
 a directional coupler wherein a medium comprising a photochromic compound is contained in a vessel circumferentially surrounding said coupler; and
 means for changing a refractive index of said medium wherein a light beam travels through an optical fiber connected to said coupler and leaks from said fiber into said vessel, irradiating said medium and causing optical path switching of said coupler.

2. An optical switch according to claim 1 wherein said directional coupler is an optical fiber coupler.

3. An optical switch according to claim 1 wherein said medium comprises a liquid or solid material with a photochromic compound dispersed therein.

4. An optical switch according to claim 3 wherein said liquid or solid material comprises a macromolecular material.

5. An optical switch according to claim 1 wherein said photochromic reaction is reversible and is initiated by different wavelengths of light.

6. An optical switch according to claim 1 wherein said circumferential medium is selected from the group consisting of a bulk system, a solution system, and a solid dispersion system.

7. An optical switch according to claim 1 wherein said circumferential medium has a refractive index value within 2% below n = 1.4583.

8. An optical switch according to claim 3 wherein said circumferential medium comprises a material selected from the group consisting of a solid material and a material which can be solidified as a final state.

9. An optical switch according to claim 3 wherein said material is selected from the group consisting of (co)polymer of fluoroalkyl (meth)acrylate, vinylidene fluoride, and silicone.

10. An optical switch, comprising:
 a directional coupler;
 a vessel circumferentially surrounding said coupler;
 a medium comprising a photochromic compound filling a space between an outer wall of said vessel and said coupler; and
 means for changing a refractive index of said medium wherein a light beam originating from a light irradiation device travels through an optical fiber into said optical switch and said light beam leaks from said switch into said vessel, irradiating said medium and causing optical path switching of said coupler, wherein said medium comprises a liquid or solid material with a photochromic compound dispersed therein, and said photochromic compound is selected from the group consisting of fulgide, azobenzene, hydrazone, oxazone, diarylethene, salicylaldehyde, spiropyran, biimidazolyl, and their derivatives.

11. An optical switch, comprising:

a directional coupler;

a vessel circumferentially surrounding said coupler;

a medium comprising a photochromic compound filling a space between an outer wall of said vessel and said coupler; and means for changing a refractive index of said medium wherein a light beams onto an outside surface of said vessel, irradiating said medium and causing optical path switching of said coupler.

12. An optical switch according to claim 11 wherein said directional coupler is an optical fiber coupler.

13. An optical switch according to claim 11 wherein said medium comprises a liquid or solid material with a photochromic compound dispersed therein.

14. An optical switch according to claim 11 wherein said liquid or solid material comprises a macromolecular material.

15. An optical switch according to claim 11 wherein said photochromic reaction is reversible and is initiated by different wavelengths of light.

16. An optical switch according to claim 11 wherein said medium is selected from the group consisting of a bulk system, a solution system, and a solid dispersion system.

17. An optical switch according to claim 11 where said circumferential medium has a refractive index value within 2% below n=1.4583.

18. An optical switch according to claim 13 wherein said circumferential medium comprises a material selected from the group consisting of a solid material and a material which can be solidified as a final state.

19. An optical switch according to claim 13 wherein said material is selected from the group consisting of (co)polymer of fluoroalkyl (meth)acrylate, vinylidene fluoride, and silicone.

20. An optical switch, comprising:

a directional coupler;

a vessel circumferentially surrounding said coupler;

a medium comprising a photochromic compound filling a space between an outer wall of said vessel and said coupler; and means for changing a refractive index of said medium wherein a light beam originating from a light irradiation device travels through an optical fiber into said optical switch and said light beam leaks from said switch into said vessel, irradiating said medium and causing optical path switching of said coupler, wherein said medium comprises a liquid or solid material with a photochromic compound dispersed therein, and said photochromic compound is selected from the group consisting of fulgide, azobenzene, hydrazone, oxazone, diarylethene, salicylaldehyde, spiropyran, biimidazolyl, and their derivatives.

* * * * *